(12) United States Patent
Park et al.

(10) Patent No.: US 11,734,403 B2
(45) Date of Patent: Aug. 22, 2023

(54) METHOD AND APPARATUS FOR BIOMETRIC AUTHENTICATION BASED ON VIBRATION SIGNAL

(71) Applicant: Korea Advanced Institute of Science and Technology, Daejeon (KR)

(72) Inventors: Yong Hwa Park, Daejeon (KR); Hyewon Yoo, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 119 days.

(21) Appl. No.: 17/117,594

(22) Filed: Dec. 10, 2020

(65) Prior Publication Data

US 2021/0182372 A1 Jun. 17, 2021

(30) Foreign Application Priority Data

Dec. 16, 2019 (KR) .................. 10-2019-0167601
Oct. 29, 2020 (KR) .................. 10-2020-0141786

(51) Int. Cl.
*G06F 21/32* (2013.01)
*G06F 3/01* (2006.01)

(52) U.S. Cl.
CPC .............. *G06F 21/32* (2013.01); *G06F 3/016* (2013.01)

(58) Field of Classification Search
None
See application file for complete search history.

(56) References Cited

U.S. PATENT DOCUMENTS

2019/0384898 A1* 12/2019 Chen ................. G06F 21/36

FOREIGN PATENT DOCUMENTS

KR 1020160051527 5/2016

* cited by examiner

*Primary Examiner* — Kenneth Bukowski
(74) *Attorney, Agent, or Firm* — PCFB LLC

(57) ABSTRACT

An electronic device and an operating method thereof are intended to perform biometric authentication based on a vibration signal, and may be configured to output at least one vibration signal to at least one touched object, receive at least one response signal for the vibration signal from the object, and perform biometric authentication on the object based on at least one of the vibration signal or the response signal. According to various embodiments, biometric authentication can be performed on the object based on a frequency response function calculated based on the vibration signal and the response signal or time-series data of the detected response signal in a time region.

20 Claims, 13 Drawing Sheets

METHOD AND APPARATUS FOR BIOMETRIC AUTHENTICATION BASED ON VIBRATION SIGNAL

CROSS REFERENCE TO RELATED APPLICATION

This application claims priority under 35 U.S.C. § 119 to Korean Patent Application Nos. 10-2019-0167601 filed on Dec. 16, 2019, and 10-2020-0141786 filed on Oct. 29, 2020, each of which is incorporated herein by reference in its entirety.

BACKGROUND OF THE INVENTION

1. Technical Field

Various embodiments relate to a method and apparatus for biometric authentication based on a vibration signal.

2. Description of the Related Art

As the protection of individual information recently becomes important, services that require a high security level through biometric recognition of a user, such as iris recognition, fingerprint recognition, and face recognition, are increased. An electronic device includes at least one sensor for biometric recognition, and collects biometric information based on an image though the sensor. Accordingly, in order for the electronic device to accurately obtain the biometric information, a user needs to take an intended act to gaze at the sensor or to bring a predetermined portion of his or her body accurately in contact with the sensor. For this reason, the user's convenience may be degraded. Furthermore, since the sensor needs to be installed on a surface of the electronic device, the electronic device requires an exposure space for the sensor and a degree of freedom of the design of the electronic device may be degraded.

SUMMARY OF THE INVENTION

Various embodiments provide an electronic device capable of efficiently performing biometric authentication on a user and an operating method thereof.

Various embodiments provide an electronic device capable of performing biometric authentication on a user without degrading user convenience, and an operating method thereof.

Various embodiments provide an electronic device capable of being reduced in size, securing a degree of freedom of the design of the electronic device, and performing biometric authentication on a user, and an operating method thereof.

In an aspect, an operating method of an electronic device may include outputting at least one vibration signal to at least one touched object through a vibration module, receiving at least one response signal for the vibration signal from the object through the vibration module, and performing biometric authentication on the object based on at least one of the vibration signal or the response signal.

In an aspect, an electronic device may include a vibration module and a processor connected to the vibration module and configured to authenticate a user. The processor may be configured to output at least one vibration signal to at least one touched object through the vibration module, receive at least one response signal for the vibration signal from the object through the vibration module, and perform biometric authentication for the object based on at least one of the vibration signal or the response signal.

DETAILED DESCRIPTION

Hereinafter, various embodiments of this document are described with reference to the accompanying drawings.

Figure 1:
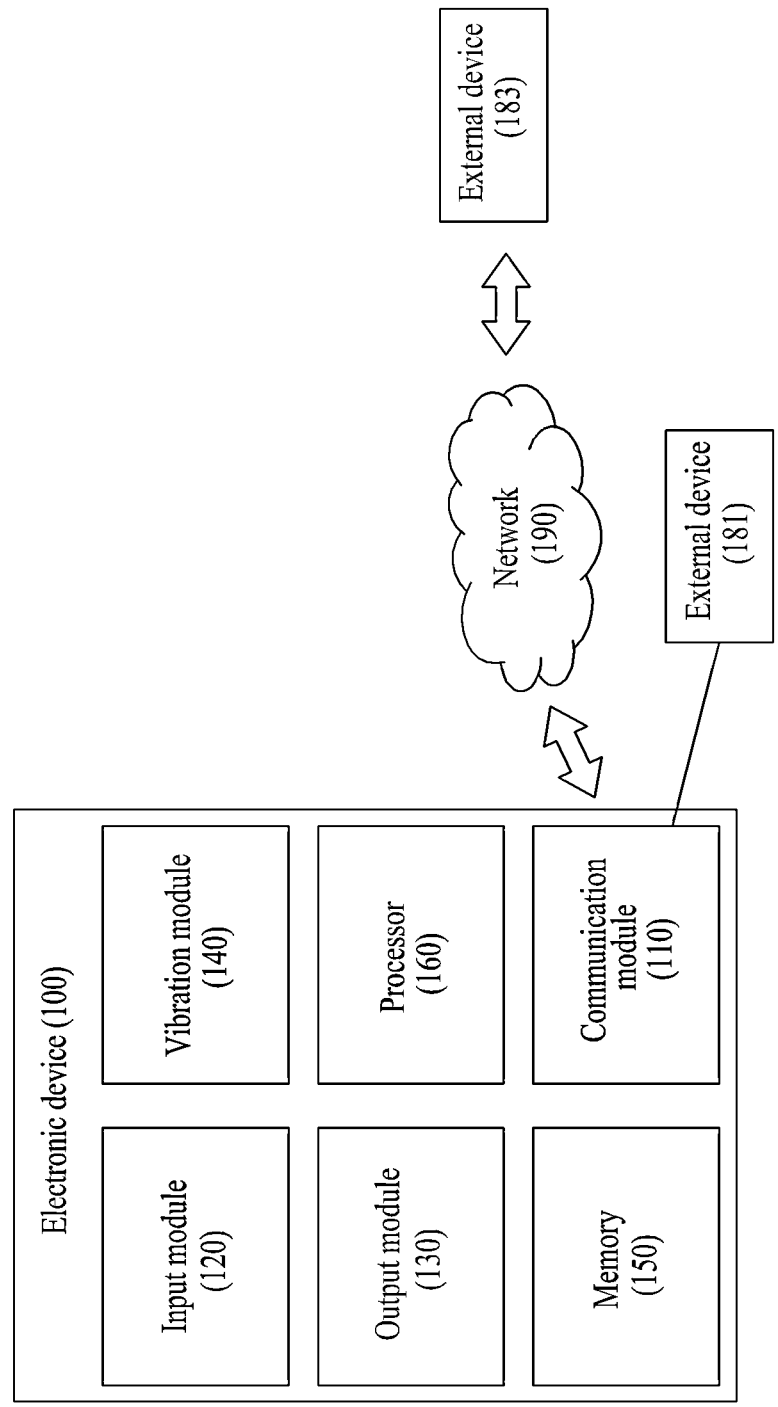
FIG. 1 is a diagram illustrating an electronic device according to various embodiments.
Figure 2:
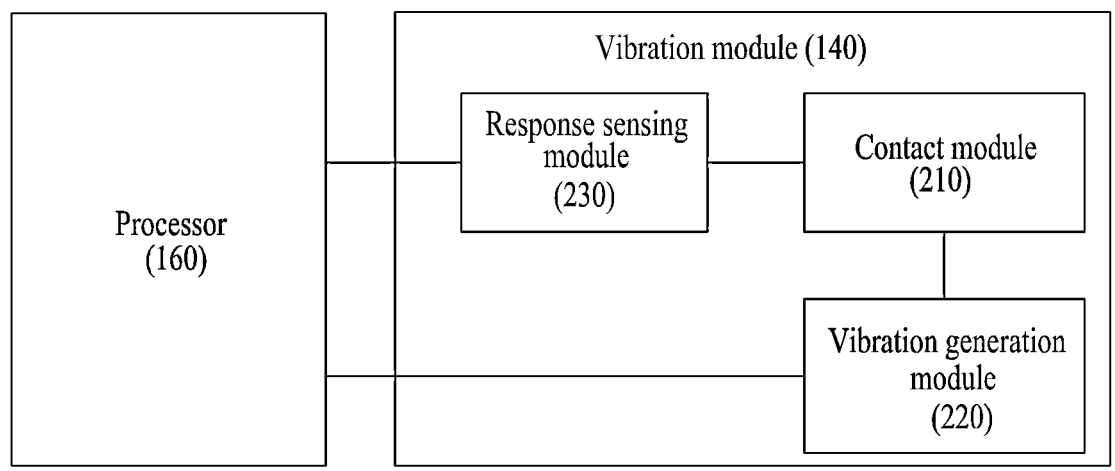
FIG. 2 is a diagram illustrating a vibration module of FIG. 1.
Figure 3A:
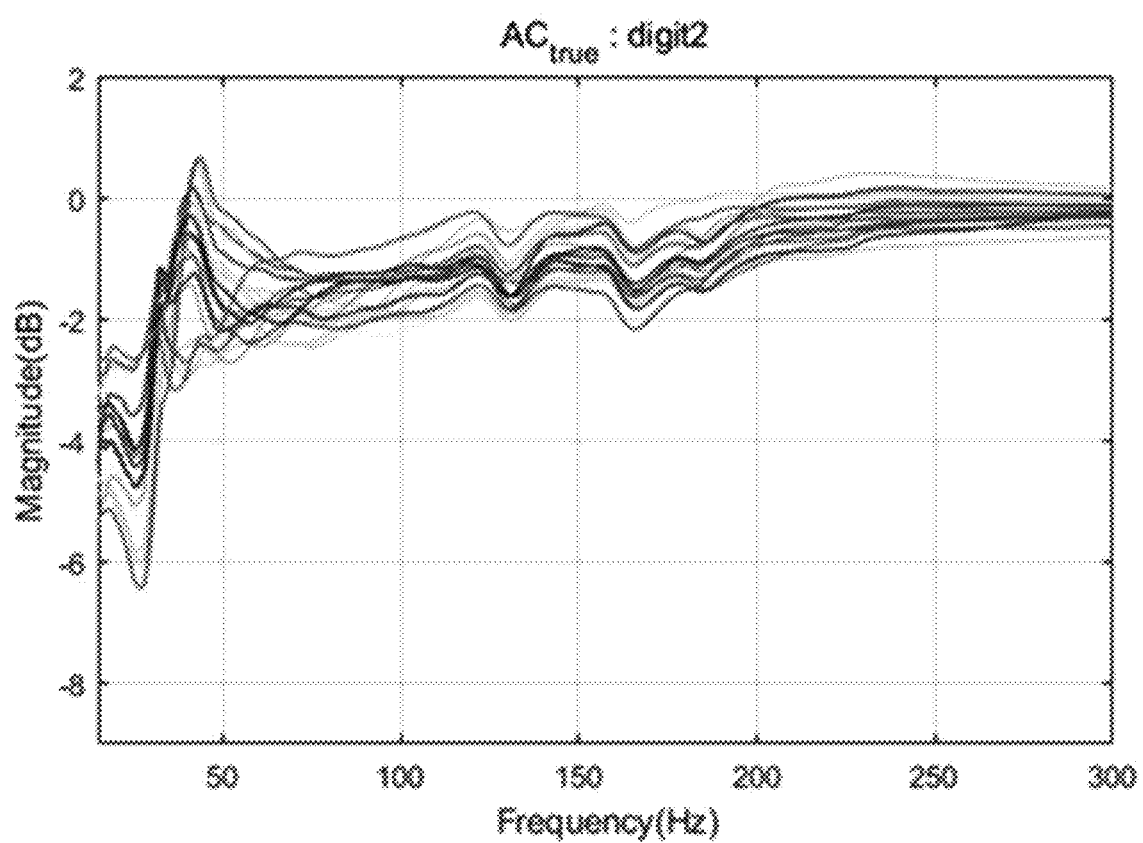
FIGS. 3A, 3B and 3C are diagrams for describing operational characteristics of the electronic device according to various embodiments.
Figure 3B:
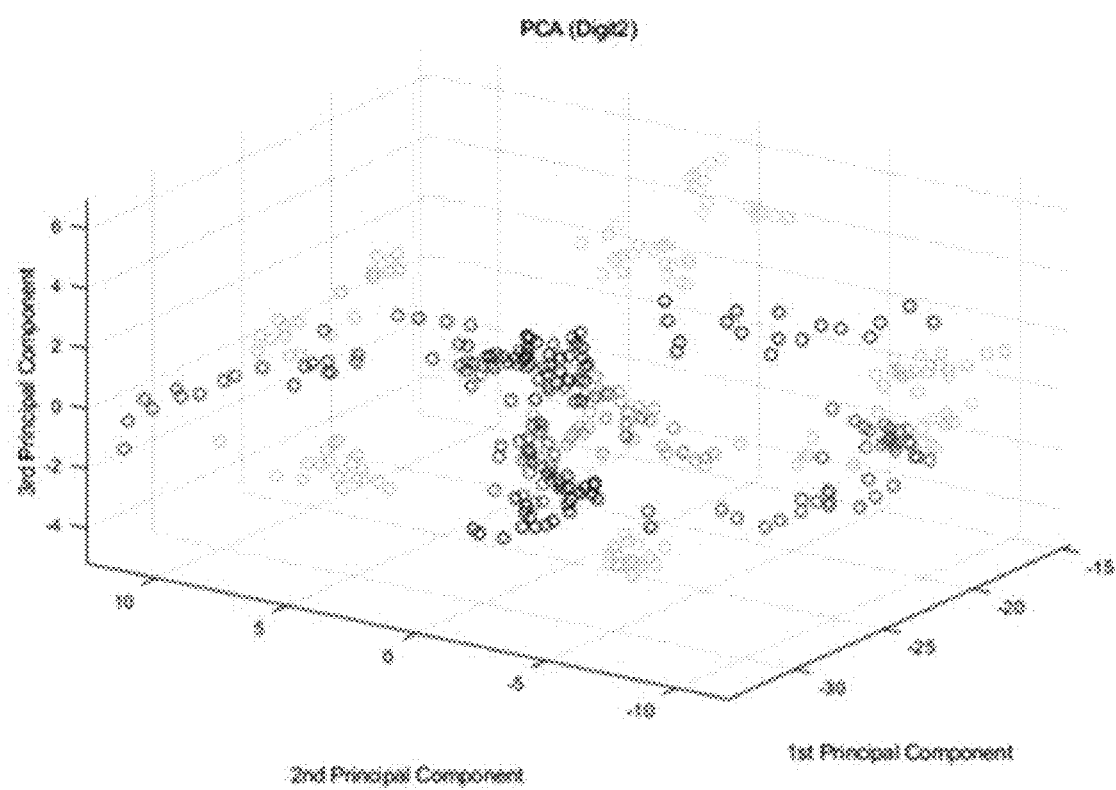
Figure 3C:
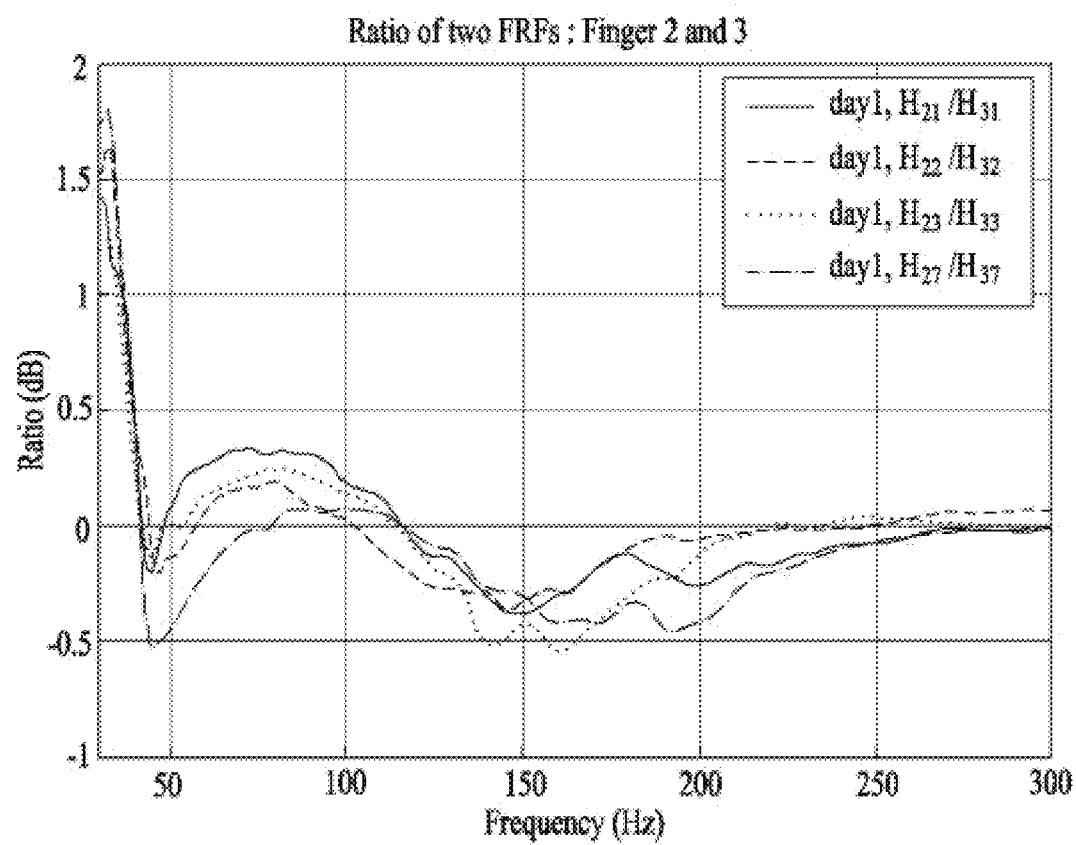

FIG. 1 is a diagram illustrating an electronic device 100 according to various embodiments. FIG. 2 is a diagram illustrating a vibration module 140 of FIG. 1. FIGS. 3A, 3B and 3C are diagrams for describing operational characteristics of the electronic device 100 according to various embodiments.

Referring to FIG. 1, the electronic device 100 according to various embodiments may include at least one of a communication module 110, an input module 120, an output module 130, a vibration module 140, a memory 150 or a processor 160. In some embodiments, at least any one of the elements of the electronic device 100 may be omitted, or one or more other elements may be added to the electronic device 100.

The communication module 110 of the electronic device 100 may perform communication with an external device 181, 183. The communication module 110 may set up a communication channel between the electronic device 100 and the external device 181, 183, and may perform communication with the external device 181, 183 through the communication channel. The communication module 110 may include at least one of a wired communication module or a wireless communication module. The wired communication module is connected to the external device 181 through wires, and may communicate with the external device 181 through the wires. The wireless communication module may include at least one of a short-distance communication module or a long-distance communication module. The short-distance communication module may communicate with the external device 181 using the short-distance communication method. For example, the short-distance communication method may include Bluetooth, WiFi direct, or infrared data association (IrDA). The long-distance communication module may communicate with the external device 183 using the short-distance communication method. In this case, the long-distance communication module may communicate the external device 183 over a network 190. For example, the network 190 may include a cellular network, the Internet, or computer networks, such as a local area network (LAN) or a wide area network (WAN).

The input module 120 may input an instruction or data to be used in at least one of the elements of the electronic device 100. The input module 120 may include at least one of an input device configured to enable a user to directly input an instruction or data to the electronic device 100 or a sensor device configured to generate a signal by detecting a surrounding environment and to input data converted from a signal. For example, the input device may include at least one of a microphone, a mouse or a keyboard. In some embodiments, the sensor device may include at least one of a touch circuitry configured to sense a touch or a sensor circuit configured to measure the intensity of a force generated by a touch.

The output module 130 may output information to the outside of the electronic device 100. The output module 130 may include at least one of a display device capable of visually displaying information or an audio device capable of outputting information in an audio signal form. For example, the display device may include at least one of a display, a hologram device or a projector. In some embodiments, the display device may be assembled with at least any one of the touch circuitry of the input module 120 or the sensor circuit of the input module 120 configured to measure the intensity of a force generated by a touch, thus being implemented as a touch screen. For example, the audio device may include at least one of a speaker or a receiver. The speaker and the receiver may be divided and used depending on respective uses, and may be selectively used regardless of their uses.

The vibration module 140 may be configured to detect a vibration characteristic of the body of a user. In this case, the body of the user is unique, and each portion of the body, that is, an object, is also unique. Accordingly, a vibration characteristic of the object may also be unique. Accordingly, the object may be identified based on the vibration characteristic, and the user may also be identified. As illustrated in FIG. 2, the vibration module 140 may include at least one of at least one contact module 210, at least one vibration generation module 220 or at least one response sensing module 230.

The contact module 210 may be provided for a contact with an object. For example, the contact module 210 may include a contact plate for having a direct contact with an object and a contact sensor for detecting at least any one of a temperature change, an electrical change or a pressure change attributable to a contact with an object.

The vibration generation module 220 may generate a mechanical vibration for an object. For example, the vibration generation module 220 includes an excitation device. The excitation device may generate a vibration using at least any one of a piezo-electric method, a voice coil method or a rotor method. Specifically, the vibration generation module 220 may generate its own vibration based on an electrical signal. In this case, the electrical signal may be converted into a vibration signal by the vibration generation module 220. Accordingly, the vibration generation module 220 generates a vibration to the contact module 210. When an object comes into contact with the contact module 210, a vibration may be indirectly generated to the object through the contact module 210. At this time, the vibration signal is transmitted to the contact module 210. When the object comes into contact with the contact module 210, the vibration signal may be output to the object through the contact module 210. For example, the vibration generation module 220 includes a shaker. The shaker may operate in a mechanical, electrical or electro-hydraulic manner. In this case, the vibration generation module 220 may generate a vibration signal based on a predetermined parameter. For example, the parameter may include at least one of the intensity (or force), frequency, displacement, speed, or acceleration of a vibration.

The response sensing module 230 may measure a mechanical vibration for an object. For example, the response sensing module 230 includes a vibration arrestor. The vibration arrestor may measure a vibration using at least any one of a piezo-electric method, a voice coil method, a micro-electro mechanical systems (MEMS) method, an electrostatic method or a resistive method. Specifically, when an object comes into contact with the contact module 210, a vibration is generated from the object, and thus a vibration may also be generated in the contact module 210. Accordingly, the response sensing module 230 may measure a vibration from the contact module 210. Accordingly, the response sensing module 230 may detect a response signal for a vibration signal.

According to one embodiment, in the contact module 210, an excitation location where a vibration is generated by the vibration generation module 220 and a vibration arrest location where a vibration is measured by the response sensing module 230 may be the same. That is, the vibration generation module 220 may generate a vibration in one region of the contact module 210. In response thereto, the response sensing module 230 may measure a vibration for the corresponding region of the contact module 210. In other words, the vibration generation module 220 may output a vibration signal to the corresponding region of the contact module 210. The response sensing module 230 may detect a response signal in the corresponding region of the contact module 210.

According to another embodiment, in the contact module 210, an excitation location and a vibration arrest location may be different. That is, the vibration generation module 220 may generate a vibration in a first region of the contact module 210. In response thereto, the response sensing module 230 may measure a vibration in a second region of the contact module 210. In other words, the vibration generation module 220 may generate a vibration signal to the first region of the contact module 210. The response sensing module 230 may detect a response signal in the second region of the contact module 210.

According to various embodiments, a vibration signal may be converted into a response signal while passing through an object, that is, the inside of the object. In this case, the vibration signal may be converted into the response signal while passing through at least any one of skin, muscle, a bone, or a joint or a blood vessel of the object. Accordingly, the response signal may be unique for each object. For example, if an object is a finger, frequency characteristics of response signals may be different depending on fingers, that is, an index finger, a middle finger, a ring finger, and a little finger, as illustrated in FIG. 3A. The reason for this is that a biometric characteristic is different depending on a finger, that is, an index finger, a middle finger, a ring finger, or a little finger. In this case, collected response signals of fingers, that is, an index finger, a middle finger, a ring finger, and a little finger, may be classified based on frequency characteristics as illustrated in FIG. 3B. Such classification results may indicate high classification accuracy as in Table 1 below.

TABLE 1

| FINGER | CLASSIFICATION RESULTS CLASSIFICATION ACCURACY |
|---|---|
| INDEX FINGER | 97.9% |
| MIDDLE FINGER | 99.4% |
| RING FINGER | 98.9% |
| LITTLE FINGER | 97.2% |

The memory 150 may store various data used by at least one of the elements of the electronic device 100. For example, the memory 150 may include at least one of a volatile memory or a non-volatile memory. Data may include a program or input data or output data for an instruction related to the program. The program may be stored in the memory 150 as software, and may include at least one of an operating system, middleware or an application. The memory 150 may store user information. The user information may include identification information of the user, and a vibration characteristic for the ID of each object of the user and each object mapped to the ID, that is, biometric information.

The processor 160 may control at least one of the elements of the electronic device 100 by executing the program of the memory 150, and may perform data processing or an operation. The processor 160 may execute an application. The processor 160 may perform the authentication of a user based on a vibration characteristic of the body of the user. At this time, the processor 160 may output a vibration signal through the vibration module 140, and may receive a response signal for the vibration signal. For example, when the electronic device 100 wakes up from a sleep state, the processor 160 may drive the vibration module 140. In this case, while the electronic device 100 is in the sleep state, when at least any one of a change in the posture of the electronic device 100, the gripping of a user for the electronic device 100, a contact of an object with the vibration module 140, or the input of the user for activating the electronic device 100 is detected, the electronic device 100 may wake up. Meanwhile, the processor 160 may provide a graphic user interface (GUI) for the authentication of a user. For example, the processor 160 may guide a location of the vibration module 140, particularly, the contact module 210 or an object for the authentication of a user, using various drawings or text through the GUI. Furthermore, the processor 160 may perform biometric authentication on the object based on at least one of a vibration signal or a response signal. Accordingly, the processor 160 may identify the object and also identify the user. In this case, the processor 160 may detect biometric information from at least any one of the vibration signal or the response signal, and may identify the object or the user based on the biometric information.

According to a first embodiment, the processor 160 may detect biometric information from a response signal. For example, the processor 160 may detect time-series data for a response signal in a time region, and may detect biometric information based on the time-series data. In this case, the processor 160 may detect the biometric information based on at least one of a pattern or shape of the time-series data. For another example, the processor 160 may detect, as biometric information, at least any one of a displacement, speed or acceleration for vibration pressure in a time region based on a response signal. For still another example, the processor 160 may detect, as biometric information, at least any one of a displacement, speed or acceleration for vibration pressure in a frequency region based on a response signal. For still another example, the processor 160 may detect at least one peak point from a response signal, and may detect information on the peak point as biometric information.

According to a second embodiment, the processor 160 may detect biometric information by combining a plurality of response signals. For example, the processor 160 may combine objects as a password having a given pattern, for example, an index finger-middle finger-ring finger or an index finger-middle finger-index finger-ring finger. For another example, the processor 160 may detect biometric information by calculating a ratio of response signals, for example, a ratio of response signals to at least two fingers. For still another example, when viewed in a long term, the accuracy of biometric information detected from a ratio of response signals may be higher than the accuracy of biometric information detected from one response signal as in Table 2 below. In this case, the accuracy of the biometric information detected from the ratio of the response signals can be maintained over time as illustrated in FIG. 3C.

TABLE 2

| | On the day | 1 day later | 2 days later |
|---|---|---|---|
| Digit2 | 97.3 | 37.5 | 63.0 |
| Digit3 | 99.1 | 67.3 | 62.8 |
| Digit (2, 3) ratio | 99.5 | 74.8 | 93.3 |

To this end, the processor 160 may simultaneously output a plurality of vibration signals, may receive response signals for the vibration signals, respectively, and may detect biometric information from the response signals. To this end, the vibration module 140 may include a plurality of the contact modules 210, a plurality of the vibration generation modules 220, and a plurality of the response sensing modules 230. When a plurality of objects comes into contact with the contact modules 210, respectively, the processor 160 may receive response signals and detect biometric information from the response signals. Alternatively, the processor 160 may sequentially output a plurality of vibration signals, may receive response signals for the vibration signals, respectively, and may detect biometric information from the response signals. To this end, as a plurality of objects sequentially comes into contact with the contact modules 210, the processor 160 may sequentially receive the response signals and detect biometric information from the response signals. Accordingly, the processor 160 may identify the objects based on the biometric information, and may identify a user by combining the objects.

According to a third embodiment, the processor 160 may calculate a frequency response function (FRF) based on a vibration signal and a response signal, and may detect biometric information based on the FRF. In this case, the processor 160 may determine at least any one of a displacement, speed or acceleration for vibration pressure in the frequency region of the vibration signal as first response information, may detect at least any one of a displacement, speed or acceleration for vibration pressure in the frequency region as second response information based on the response signal, and may calculate the FRF using the first response information and the second response information. In this case, the processor 160 may detect the FRF as biometric information. Alternatively, the processor 160 may pre-process the FRF, and may detect biometric information based on the pre-processed FRF. In this case, the biometric information may include a mass parameter, hardness parameter, and attenuation parameter of the FRF.

For example, the processor 160 may perform pre-processing in order to remove an effect attributable to a vibration component of the electronic device 100 or the vibration module 140 from an FRF. In this case, the vibration signal and the response signal may include a vibration component of the electronic device 100 or the vibration module 140 itself, in addition to a vibration component of an object. Accordingly, the processor 160 can remove an effect attributable to a vibration component of the electronic device 100 or the vibration module 140 from the FRF. For example, the vibration component of the electronic device 100 or the vibration module 140 may be related to weight of the electronic device 100 or the vibration module 140.

For another example, the processor 160 may perform pre-processing to generate a frequency spectrum for an FRF. In this case, the processor 160 may detect a pattern, a shape, etc. of the frequency spectrum. Furthermore, the processor 160 may compare the FRF with a modeled FRF based on the frequency spectrum. In this case, the memory 150 may store a modeled FRF for an object or a user. That is, the processor 160 may learn an FRF based on a pattern, a shape, etc. of a frequency spectrum, and may check a difference between the FRF and the modeled FRF. In this case, the processor 160 may selectively use some of the frequency spectrum. Specifically, different pieces of importance may be assigned to frequency bands. The processor 160 may extract at least some of the frequency spectrum in accordance with at least one frequency band having predetermined importance or more, and may use the extracted portion.

The electronic device 100 according to various embodiments of this document may be various types of devices. The electronic device 100 may include a portable communication device (e.g., a smart phone), a computer device, a portable multimedia device, a portable medical device, a camera, a wearable device, or home appliances, for example. The electronic device 100 according to various embodiments of this document is not limited to the aforementioned devices.

The electronic device 100 according to various embodiments may include the vibration module 140, and the processor 160 coupled to the vibration module 140 and configured for the authentication of a user.

According to various embodiments, the processor 160 may be configured to output at least one vibration signal to at least one touched object through the vibration module 140, receive at least one response signal for the vibration signal from the object through the vibration module 140, and to perform biometric authentication on the object based on at least one of the vibration signal or the response signal.

According to various embodiments, the vibration module 140 may include the contact module 210 configured to come into contact with an object, the vibration generation module 220 configured to generate a vibration in the contact module 210 and to output a vibration signal in response to the generated vibration, and the response sensing module 230 configured to measure the vibration generated in the contact module 210 and to detect a response signal in response to the measured vibration.

According to one embodiment, the vibration generation module 220 may generate a vibration in one region of the contact module 210. The response sensing module 230 may measure a vibration in one region of the contact module 210.

According to another embodiment, the vibration generation module 220 may generate a vibration in one region of the contact module 210. The response sensing module 230 may measure a vibration in another region of the contact module 210.

According to various embodiments, the processor 160 may be configured to calculate an FRF based on a vibration signal and a response signal and to perform biometric authentication on an object based on the FRF.

According to various embodiments, the processor 160 may be configured to determine at least any one of a displacement, speed or acceleration for vibration pressure in the frequency region of a vibration signal as first response information, detect at least any one of the displacement, speed or acceleration for vibration pressure in the frequency region as second response information based on a response signal, and calculate an FRF based on the first response information and the second response information.

According to various embodiments, the processor 160 may be configured to pre-process an FRF in order to remove an effect attributable to a vibration component of the electronic device 100 or the vibration module 140 from the RFT and to perform biometric authentication on an object based on the pre-processed FRF.

According to various embodiments, an effect attributable to a vibration component of the electronic device 100 or the vibration module 140 may be related to weight of the electronic device 100 or the vibration module 140.

According to various embodiments, the processor 160 may be configured to generate a frequency spectrum for an FRF and to perform biometric authentication on an object by comparing the FRF with a modeled FRF based on the frequency spectrum.

According to various embodiments, the processor 160 may be configured to detect biometric information based on an FRF and to determine whether biometric authentication is successful based on whether user information corresponding to the biometric information is detected.

According to various embodiments, biometric information may include a mass parameter, hardness parameter and attenuation parameter of an FRF.

According to various embodiments, the processor 160 may be configured to detect time-series data of a response signal in a time region and to perform biometric authentication on an object based on at least one of a pattern or shape of the time-series data.

According to various embodiments, the processor 160 may be configured to combine a plurality of response signals according to the sequence of time and to perform biometric authentication on a combination of a plurality of objects according to the sequence of time.

Figure 4:
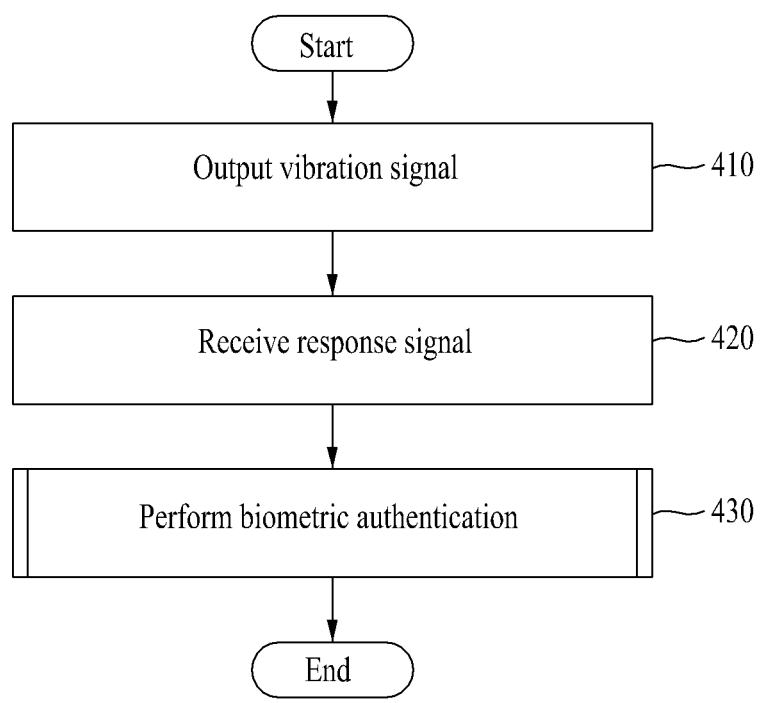
FIG. 4 is a diagram illustrating an operating method of the electronic device according to various embodiments.

FIG. 4 is a diagram illustrating an operating method of the electronic device 100 according to various embodiments.

Referring to FIG. 4, at operation 410, the electronic device 100 may output at least one vibration signal to at least one touched object. The processor 160 may output the vibration signal through the vibration module 140. At this time, the vibration generation module 220 may generate the vibration signal based on a predetermined parameter. For example, the parameter may include at least one of the intensity (or force), frequency, displacement, speed, or acceleration of the vibration signal. In this case, when a contact of the object with the vibration module 140 is detected, the processor 160 may output the vibration signal. Specifically, the vibration generation module 220 may generate its own vibration based on an electrical signal. In this case, in the vibration generation module 220, the electrical signal may be converted into the vibration signal. Accordingly, the vibration generation module 220 generates the vibration to the contact module 210. When the object comes into contact with the contact module 210, a vibration may also be indirectly generated to the object through the contact module 210. At this time, the vibration signal is transmitted to the contact module 210. When the object comes into contact with the contact module 210, the vibration signal may be output to the object through the contact module 210. According to various embodiments, the vibration signal may be converted into a response signal while passing through the object, that is, the inside of the object. In this case, the vibration signal may be converted into the response signal while passing through at least any one of skin, muscle, a bone, a joint or a blood vessel of the object.

At operation 420, the electronic device 100 may receive at least one response signal for the vibration signal from the object. The processor 160 may receive the response signal through the vibration module 140. In this case, the processor 160 may detect, as the response signal, a signal received within a predetermined time range after outputting the vibration signal. Specifically, when the object comes into contact with the contact module 210, a vibration is generated from the object, and thus a vibration may also be generated from the contact module 210. Accordingly, the response sensing module 230 may measure the vibration from the contact module 210. Accordingly, the response sensing module 230 may detect the response signal for the vibration signal.

At operation 430, the electronic device 100 may perform biometric authentication on the object. The processor 160 may perform the biometric authentication the an object based on at least one of the vibration signal or the response signal. Accordingly, the processor 160 may identify the object and also identify a user. Furthermore, the processor 160 may control an operation of at least any one of the electronic device 100 or the external device 181, 183 based on whether the biometric authentication is successful.

Figure 5:
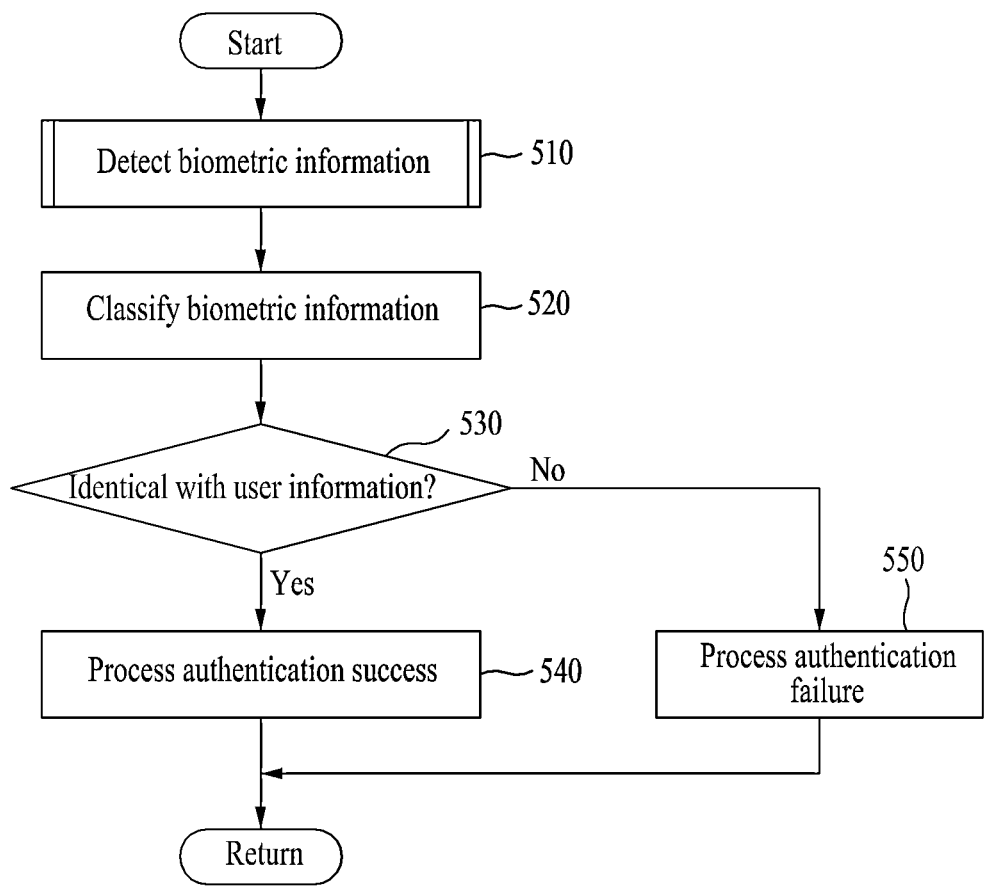
FIG. 5 is a diagram illustrating an operation of performing biometric authentication in the operating method of FIG. 4.
Figure 6:
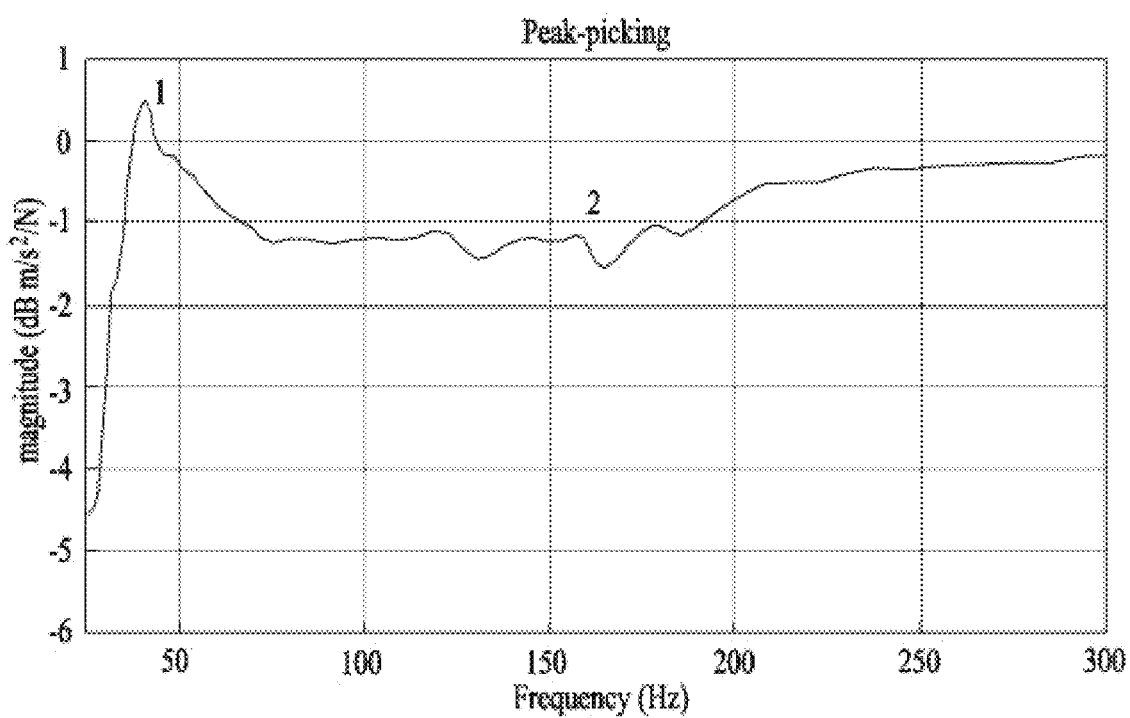
FIG. 6 is a diagram for describing an example of an operation of detecting biometric information in FIG. 5.

FIG. 5 is a diagram illustrating an operation of performing biometric authentication in the operating method of FIG. 4. FIG. 6 is a diagram for describing an example of an operation of detecting biometric information in FIG. 5.

Referring to FIG. 5, at operation 510, the electronic device 100 may detect biometric information on an object. The processor 160 may detect biometric information from at least one of a vibration signal or a response signal.

According to a first embodiment, the processor 160 may detect biometric information from a response signal. For example, the processor 160 may detect time-series data of the response signal in a time region, and may detect biometric information based on the time-series data. In this case, the processor 160 may detect the biometric information based on at least one of a pattern or shape of the time-series data. For another example, the processor 160 may detect at least any one of a displacement, speed or acceleration for vibration pressure in the time region as the biometric information based on the response signal. For still another example, the processor 160 may detect at least any one of a displacement, speed or acceleration for vibration pressure in a frequency region as biometric information based on the response signal. For still another example, as illustrated in FIG. 6, the processor 160 may detect at least one peak point from the response signal, and may detect information on the peak point as the biometric information.

According to a second embodiment, the processor 160 may detect biometric information by combining a plurality of response signals. For example, the processor 160 may combine objects as a password having a given pattern, for example, like an index finger-middle finger-ring finger or an index finger-middle finger-index finger-ring finger. For another example, the processor 160 may detect the biometric information by calculating a ratio of response signals, for example, a ratio of response signals for at least two fingers.

To this end, the processor 160 may simultaneously output a plurality of vibration signals, may receive response signals for the respective vibration signals, and may detect biometric information from the response signals. To this end, the vibration module 140 may include a plurality of the contact modules 210, a plurality of the vibration generation modules 220, and a plurality of the response sensing modules 230. When a plurality of objects comes into contact with the contact modules 210, respectively, the processor 160 may receive response signals and detect biometric information from the response signals. Alternatively, the processor 160 may sequentially output a plurality of vibration signals, may receive response signals for the vibration signals, respectively, and may detect biometric information from the response signals. To this end, when the plurality of objects sequentially comes into contact with the contact modules 210, the processor 160 may sequentially receive the response signals and detect the biometric information from the response signals.

According to a third embodiment, the processor 160 may calculate an FRF based on a vibration signal and a response signal. Furthermore, the processor 160 may detect biometric information based on the FRF. This will be more specifically described with reference to FIGS. 7, 8A, 8B and 9.

Figure 7:
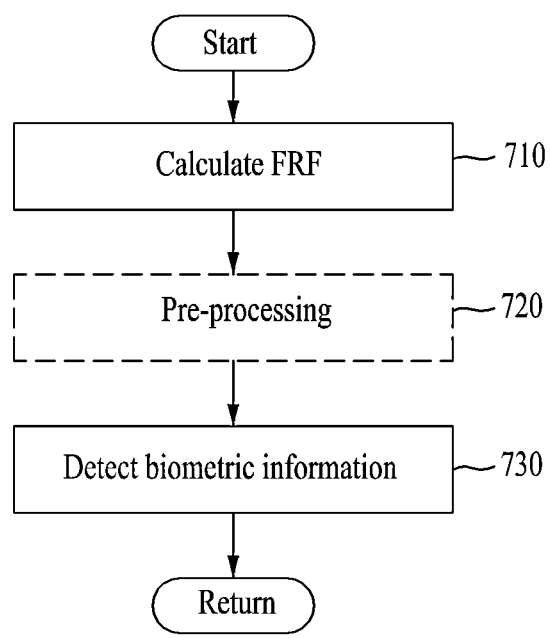
FIG. 7 is a diagram for describing another example of an operation of detecting biometric information in FIG. 5.
Figure 8A:
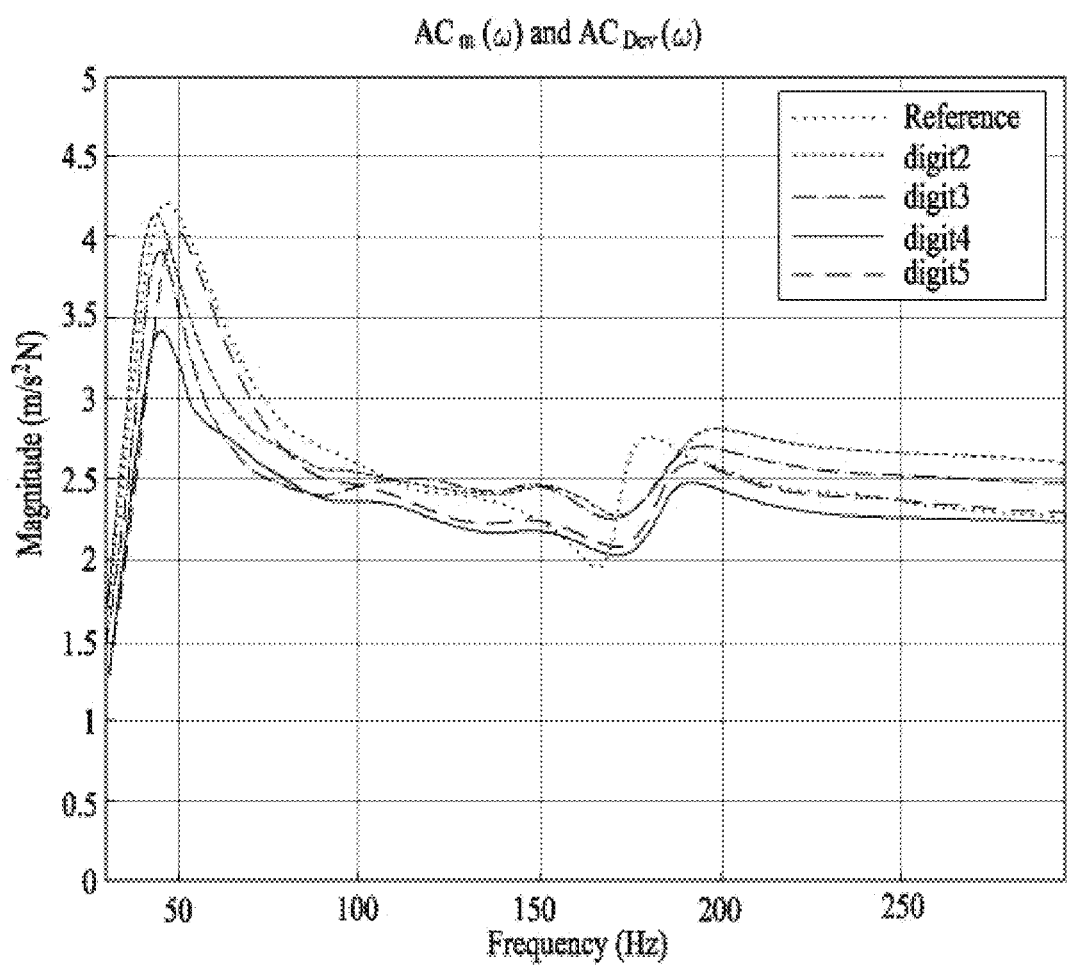
FIGS. 8A and 8B are diagrams for describing a preprocessing operation of FIG. 7.
Figure 8B:
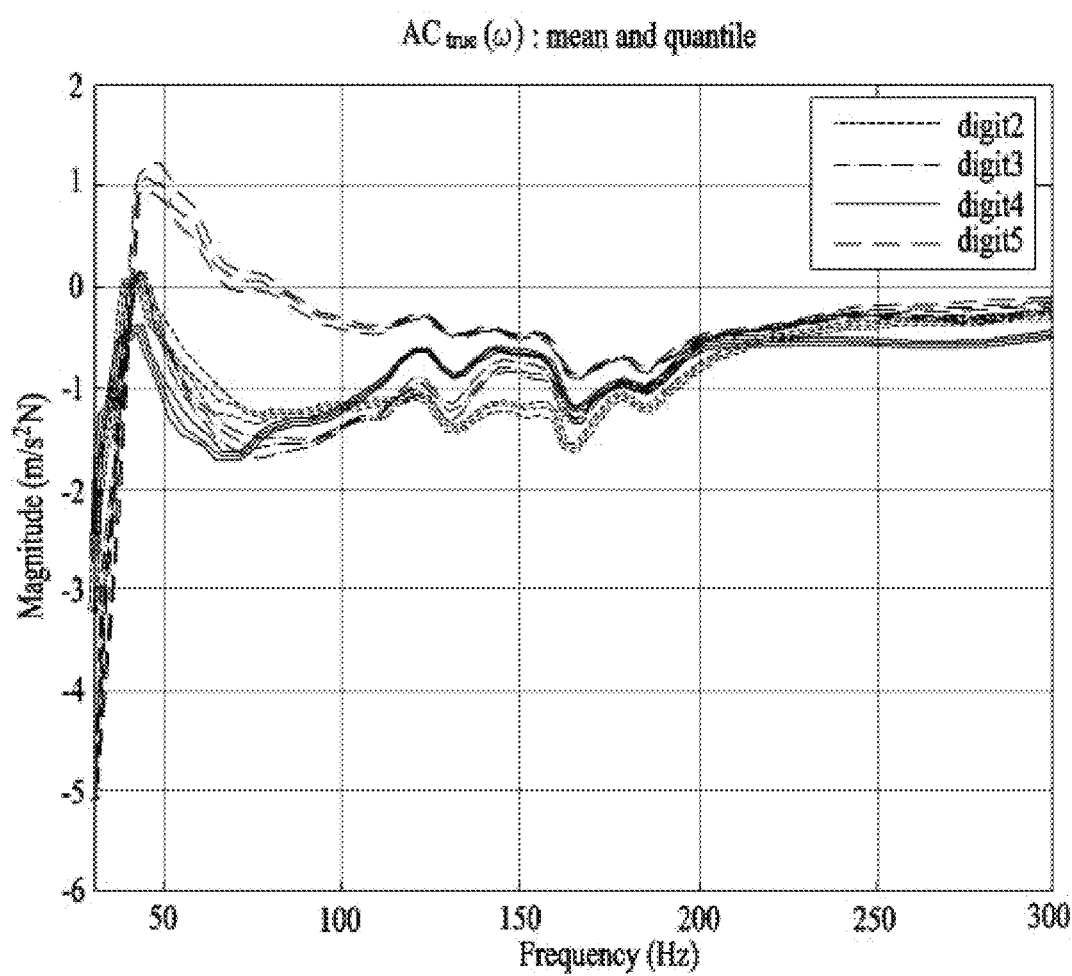

FIG. 7 is a diagram for describing another example of an operation of detecting biometric information in FIG. 5. FIGS. 8A and 8B are diagrams for describing a pre-processing operation of FIG. 7.

Referring to FIG. 7, at operation 710, the electronic device 100 may calculate an FRR based on a vibration signal and a response signal. In this case, the processor 160 may calculate the FRF using first response information related to the vibration signal and second response information related to the response signal. In this case, as in Equation 1 below, the processor 160 may calculate the FRF as a ratio of the first response information and the second response information. For example, the processor 160 may determine, as the first response information, at least any one of a displacement, speed or acceleration for vibration pressure in the frequency region of the vibration signal, and may detect, as the second response information, at least any one of the displacement, speed or acceleration for vibration pressure in the frequency region based on the response signal.

$$H(w) = \frac{A(\omega)}{F(\omega)} = \frac{\ddot{x}(\omega)}{F(\omega)} = -\frac{\omega^2}{(K + i\omega C - \omega^2 M)} \qquad (1)$$

In Equation 1, H(w) may indicate the FRF, F(w) may indicate the first response information, A(w) may indicate the second response information, and w may indicate an angular frequency of the vibration signal. Furthermore, M may indicate a mass parameter of the electronic device 100 or the vibration module 140, K may indicate a hardness parameter of the electronic device 100 or the vibration module 140, and C may indicate an attenuation parameter of the electronic device 100 or the vibration module 140.

At operation 720, the electronic device 100 may perform pre-processing on the FRF. The processor 160 may perform the pre-processing in order to remove an effect attributable to a vibration component of the electronic device 100 or the vibration module 140 from the FRF. In this case, the vibration signal and the response signal may include a vibration component of the electronic device 100 or the vibration module 140 itself, in addition to a vibration component of an object. Accordingly, the processor 160 may remove, from the FRF, the effect attributable to the vibration component of the electronic device 100 or the vibration module 140. For example, the vibration component of the electronic device 100 or the vibration module 140 may be related to weight of the electronic device 100 or the vibration module 140. The processor 160 may remove, from the FRF, a component related to weight of the electronic device 100 or the vibration module 140 as in Equation 2. For example, as illustrated in FIG. 8A, the processor 160 may remove, from the FRF, a component related to weight of the electronic device 100 or the vibration module 140. Accordingly, as illustrated in FIG. 8B, the processor 160 may obtain a pre-processed FRF.

$$H_{true} = \frac{H_m(\omega)}{H_{Dev}(\omega) - m_{Dev}H_m(\omega)} \quad (2)$$

In Equation 2, $H_m$ may indicate an FRF calculated in the electronic device 100, $H_{Dev}$ may indicate an FRF when an object is not present, $H_{true}$ may indicate an FRF obtained by removing, from $H_m$, a component related to weight of the electronic device 100 or the vibration module 140, and $m_{Dev}$ may indicate the mass of the electronic device 100 or the vibration module 140.

At operation 730, the electronic device 100 may detect the FRF as biometric information. The processor 160 may detect, as the biometric information, any one of the FTF calculated FRF at operation 710 or the FRF pre-processed at operation 720. Thereafter, the electronic device 100 may return to FIG. 5.

Figure 9:
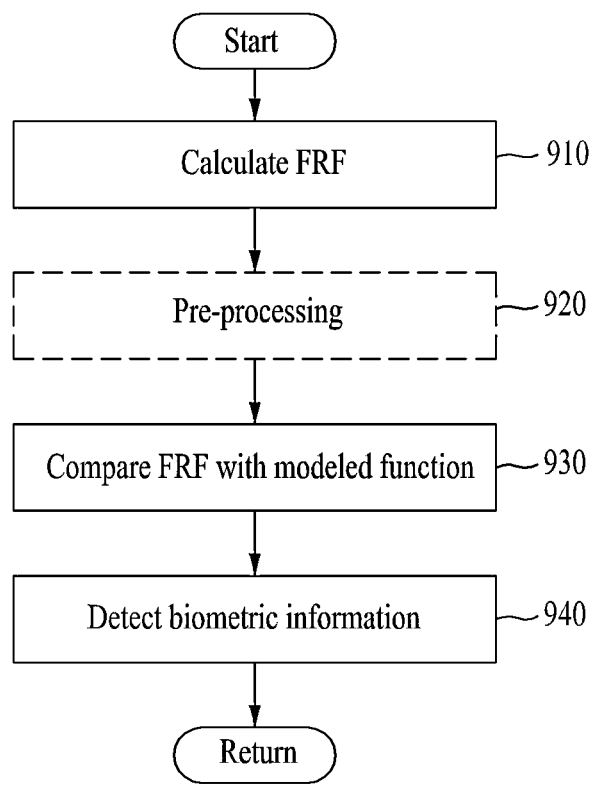
FIG. 9 is a diagram for describing still another example of an operation of detecting biometric information in FIG. 5.

FIG. 9 is a diagram for describing still another example of the operation of detecting biometric information in FIG. 5.

Referring to FIG. 9, at operation 910, the electronic device 100 may calculate an FRF based on a vibration signal and a response signal. In this case, the processor 160 may calculate the FRF using first response information related to the vibration signal and second response information related to the response signal. In this case, the processor 160 may calculate the FRF using a method similar to operation 710 of FIG. 7.

At operation 920, the electronic device 100 may perform pre-processing on the FRF. The processor 160 may perform the pre-processing in order to remove, from the FRF, an effect attributable to a vibration component of the electronic device 100 or the vibration module 140. In this case, the processor 160 may remove, from the FRF, the effect attributable to the vibration component of the electronic device 100 or the vibration module 140 using a method similar to operation 720 of FIG. 7. Furthermore, the processor 160 may perform the pre-processing in order to generate a frequency spectrum for the FRF. In this case, the processor 160 may detect a pattern, a shape, etc. of the frequency spectrum.

At operation 930, the electronic device 100 may compare the FRF with a modeled FRF. In this case, the processor 160 may compare the FRF with the modeled FRF based on a frequency spectrum. To this end, the memory 150 may store the modeled FRF. The modeled FRF is generated through biomechanical modeling for an object or a user, and may be generated when the FRF for a user is previously registered. That is, the processor 160 may learn an FRF based on a pattern, a shape, etc. of a frequency spectrum, and may check a difference between the FRF and a modeled FRF. In this case, the processor 160 may selectively use some of the frequency spectrum. Specifically, different pieces of importance may be assigned to frequency bands. The processor 160 may extract at least some of the frequency spectrum in accordance with at least one frequency band having predetermined importance or more, and may use the extracted portion. In this case, for optimization, the processor 160 may use a root-mean-square deviation of the FRF and the modeled FRF as a target function. Specifically, the processor 160 may use, as the target function, at least any one of a root-mean-square deviation within a measurement frequency range or a root-mean-square deviation obtained by applying a weight near the resonant frequency of the FRF.

At operation 940, the electronic device 100 may detect biometric information from the FRF based on the modeled FRF. The processor 160 may detect a mass parameter, hardness parameter, and attenuation parameter of the FRF as the biometric information based on the modeled FRF. In this case, the mass parameter, the hardness parameter, and the attenuation parameter may be related to the FRF as in Equation 1. Thereafter, the electronic device 100 may return to FIG. 5.

Referring back to FIG. 5, at operation 520, the electronic device 100 may classify the biometric information. The processor 160 may search for previously stored user information based on the biometric information. In this case, the processor 160 may search for the user information based on similarity between the user information and the biometric information. To this end, the processor 160 may use classification machine learning. For example, the processor 160 may classify the biometric information using a binary classification support vector machine (SVM). At operation 530, the electronic device 100 may determine whether user information identical with the biometric information is detected. The processor 160 may detect, as the user information identical with the biometric information, user information whose similarity with the biometric information is greater than a threshold value.

When the identical user information is detected at operation 530, at operation 540, the electronic device 100 may process that the biometric authentication on the object is successful. The processor 160 may identify a user based on the user information. Furthermore, the processor 160 may control an operation of at least any one of the electronic device 100 or the external device 181, 183 based on access rights assigned to the user. For example, if the electronic device 100 is a smart phone, the electronic device 100 may release the lock of the smart phone, and may permit access by a user. For another example, if the external device 181, 183 is a door, the electronic device 100 may open the door. For still another example, if the external device 181, 183 is an elevator, the electronic device 100 may permit an operation of the elevator.

If identical user information is not detected at operation 530, at operation 550, the electronic device 100 may process that the biometric authentication on the object has failed. The processor 160 may control an operation of at least any one of the electronic device 100 or the external device 181, 183 in order to limit access by the user. For example, if the electronic device 100 is a smart phone, the electronic device 100 may maintain the lock of the smart phone. For another example, if the external device 181, 183 is a door, the electronic device 100 may close the door or maintain the closing of the door. For still another example, if the external device 181, 183 is an elevator, the electronic device 100 may stop an operation of the elevator.

According to various embodiments, the electronic device 100 may register user information. Accordingly, the electronic device 100 may perform the authentication of a user based on the user information. This will be more specifically described with reference to FIG. 10.

Figure 10:
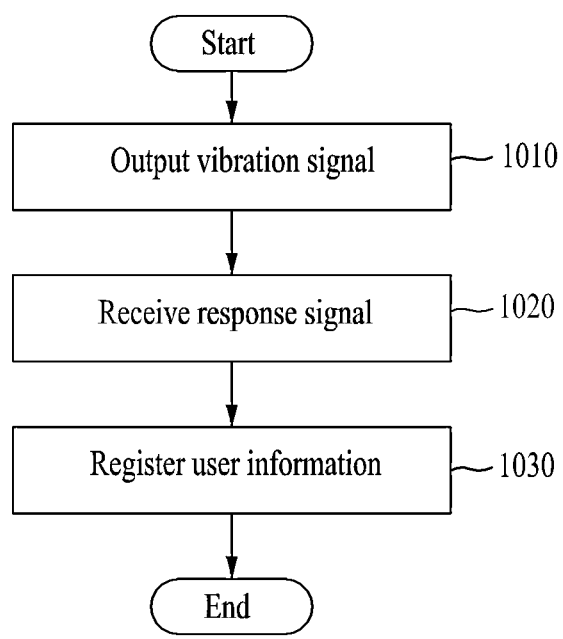
FIG. 10 is a diagram illustrating an operating method of the electronic device according to various embodiments.

FIG. 10 is a diagram illustrating an operating method of the electronic device 100 according to various embodiments.

Referring to FIG. 10, at operation 1010, the electronic device 100 may output at least one vibration signal to at least one touched object. The processor 160 may output the vibration signal through the vibration module 140. Specifically, the vibration generation module 220 may generate its own vibration based on an electrical signal. In this case, in the vibration generation module 220, the electrical signal may be converted into the vibration signal. Accordingly, the vibration generation module 220 generates the vibration to the contact module 210. When an object comes into contact with the contact module 210, a vibration may also be indirectly generated to the object through the contact module 210. At this time, the vibration signal is transmitted to the contact module 210. When the object comes into contact with the contact module 210, the vibration signal may be output to the object through the contact module 210. In this case, the vibration generation module 220 may generate the vibration based on a predetermined parameter. For example, the parameter may include at least one of the intensity (or force), frequency, displacement, speed, or acceleration of the vibration. According to various embodiments, the vibration signal may be converted into the response signal while passing through the object, that is, the inside of the object. In this case, the vibration signal may be converted into the response signal while passing through at least any one of skin, muscle, a bone, a joint or a blood vessel of the object.

At operation 1020, the electronic device 100 may receive at least one response signal for the vibration signal from the object. The processor 160 may receive the response signal through the vibration module 140. In this case, the processor 160 may detect, as the response signal, a signal received within a predetermined time range after outputting the vibration signal. Specifically, when the object comes into contact with the contact module 210, a vibration may also be generated from the contact module 210 because a vibration is generated from the object. Accordingly, the response sensing module 230 may measure the vibration from the contact module 210. Accordingly, the response sensing module 230 may detect the response signal for the vibration signal.

At operation 1030, the electronic device 100 may register user information. The processor 160 may register the user information based on at least one of the vibration signal or the response signal. The processor 160 may detect biometric information of the user based on at least one of the vibration signal or the response signal, and may store the biometric information in the memory 150 as the user information along with identification information of the user. In this case, the operation of detecting biometric information based on at least one of a vibration signal or a response signal is similar to that described above, and thus a detailed description thereof is omitted.

An operating method of the electronic device 100 according to various embodiments may include outputting at least one vibration signal to at least one touched object through the vibration module 140, receiving at least one response signal for the vibration signal from the object through the vibration module 140, and performing biometric authentication on the object based on at least one of the vibration signal or the response signal.

According to various embodiments, the vibration module 140 may include the contact module 210 configured to come into contact with an object, the vibration generation module 220 configured to generate a vibration in the contact module 210 and to output a vibration signal in response to the generated vibration, and the response sensing module 230 configured to measure the vibration generated in the contact module 210 and to detect a response signal in response to the measured vibration.

According to one embodiment, the vibration generation module 220 may generate a vibration in one region of the contact module 210. The response sensing module 230 may measure a vibration in one region of the contact module 210.

According to another embodiment, the vibration generation module 220 may generate a vibration in one region of the contact module 210. The response sensing module 230 may measure a vibration in another region of the contact module 210.

According to various embodiments, the performing of biometric authentication may include calculating an FRF based on the vibration signal and the response signal, and performing the biometric authentication on the object based on the FRF.

According to various embodiments, the calculating of an FRF may include determining, as first response information, at least any one of a displacement, speed or acceleration for vibration pressure in the frequency region of the vibration signal based on the response signal, detecting, as second response information, at least any one of the displacement, speed or acceleration for vibration pressure in the frequency region, and calculating the FRF using the first response information and the second response information.

According to various embodiments, the performing of the biometric authentication based on the FRF may include pre-processing the FRF in order to remove, from the FRF, an effect attributable to a vibration component of the electronic device 100 or the vibration module 140, and performing the biometric authentication on the object based on the pre-processed FRF.

According to various embodiments, the effect attributable to the vibration component of the electronic device 100 or the vibration module 140 may be related to weight of the electronic device 100 or the vibration module 140.

According to various embodiments, the performing of the biometric authentication based on the FRF may include generating a frequency spectrum for the FRF, and performing the biometric authentication on the object by comparing the FRF with a modeled FRF based on the frequency spectrum.

According to various embodiments, the performing of the biometric authentication based on the FRF may include detecting biometric information based on the FRF, and determining whether the biometric authentication is successful based on whether user information corresponding to the biometric information is detected.

According to various embodiments, the biometric information may include a mass parameter, hardness parameter, and attenuation parameter of the FRF.

According to various embodiments, the performing of the biometric authentication may include detecting time-series data of the response signal in a time region, and performing the biometric authentication on the object based on at least one of a pattern or shape of the time-series data.

According to various embodiments, the performing of the biometric authentication may include combining a plurality of response signals according to the sequence of time and performing the biometric authentication on a combination of a plurality of objects according to the sequence of time.

According to various embodiments, the electronic device 100 can perform biometric authentication on a user based on a vibration characteristic of the body. Accordingly, the electronic device 100 can perform biometric authentication on a user even if the user does not accurately bring a predetermined portion of his or her body into contact with the electronic device 100. Accordingly, the electronic device 100 can perform biometric authentication on a user even without degrading user convenience. Furthermore, the size of the electronic device 100 can be reduced and a degree of freedom of the design of the electronic device 100 can be secured because a component for detecting a vibration characteristic of the body, that is, the vibration module 140, does not need to be exposed to a surface of the electronic device 100. Accordingly, the electronic device 100 can efficiently perform biometric authentication on a user.

Various embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A or/and B", "A, B or C" or "at least one of A, B and/or C", may include all of possible combinations of listed items together. Expressions, such as "a first," "a second," "the first" and "the second", may modify corresponding elements regardless of the sequence and/or importance, and are used to only distinguish one element from the other element and do not limit corresponding elements. When it is described that one (e.g., first) element is "(operatively or communicatively) connected to" or "coupled with" the other (e.g., second) element, one element may be directly connected to the other element or may be connected to the other element through another element (e.g., third element).

The "module" used in this document includes a unit configured as hardware, software or firmware, and may be interchangeably used with a term, such as logic, a logical block, a part or a circuit. The module may be an integrated part, a minimum unit to perform one or more functions, or a part thereof. For example, the module may be configured as an application-specific integrated circuit (ASIC).

Various embodiments of this document may be implemented as software including one or more instructions stored in a storage medium (e.g., the memory 150) readable by a machine (e.g., the electronic device 100). For example, a processor (e.g., the processor 160) of the machine may invoke at least one of one or more stored commands from the storage medium, and may execute the command. This enables the machine to execute at least one function based on the fetched at least one command. The one or more instructions may include code generated by a compiler or code executable by an interpreter. The storage medium readable by the machine may be provided in the form of a non-transitory storage medium. In this case, the term "non-transitory" means that the storage medium is a tangible device and does not include a signal (e.g., electromagnetic waves). The term does not distinguish between a case where data is semi-permanently stored in the storage medium and a case where data is temporally stored in the storage medium.

According to various embodiments, each of elements (e.g., module or program) may include a single entity or a plurality of entities. According to various embodiments, one or more of the aforementioned elements or operations may be omitted or one or more other elements or operations may be added. Alternatively or additionally, a plurality of elements (e.g., modules or programs) may be integrated into a single element. In such a case, the integrated element may perform one or more functions of each of the plurality of elements identically or similarly to a function performed by a corresponding element of the plurality of elements before they are integrated. According to various embodiments, operations performed by a module, a program or other elements may be executed sequentially, in parallel, repeatedly, or heuristically, or one or more of the operations may be executed in different order or may be omitted, or one or more operations may be added.

According to various embodiments, the electronic device can perform biometric authentication on a user based on a vibration characteristic of the body. Accordingly, the electronic device can perform biometric authentication on a user even if the user does not accurately bring a predetermined portion of his or her body into contact with the electronic device. Accordingly, the electronic device can perform biometric authentication on a user even without degrading user convenience. Furthermore, the size of the electronic device can be reduced and a degree of freedom of the design of the electronic device can be secured because a component for detecting a vibration characteristic of the body does not need to be exposed to a surface of the electronic device. Accordingly, the electronic device can efficiently perform biometric authentication on a user.

What is claimed is:

1. An operating method of an electronic device, comprising:
    outputting a first vibration signal to a first touched object through a vibration module;
    receiving a first response signal for the first vibration signal from the first touched object through the vibration module;
    outputting a second vibration signal to a second touched object through the vibration module;
    receiving a second response signal for the second vibration signal from the touched object through the vibration module; and
    performing biometric authentication based on a ratio relationship between the first response signal and the second response signal.

2. The operating method of claim 1, wherein the vibration module comprises:
    a contact module configured to come into contact with at least one of the first touched object and the second touched object;
    a vibration generation module configured to generate a vibration in the contact module and to output the vibration signal in response to the generated vibration; and
    a response sensing module configured to measure the vibration generated in the contact module and to detect the response signal in response to the measured vibration.

3. The operating method of claim 2, wherein in the contact module, a region in which the vibration is generated by the vibration generation module and a region which the vibration is measured by the response sensing module are identical.

4. The operating method of claim 1, wherein the performing of the biometric authentication comprises:
calculating a frequency response function based on the vibration signal and the response signal; and
performing the biometric authentication on the object based on the frequency response function.

5. The operating method of claim 4, wherein the calculating of the frequency response function comprises:
determining, as first response information, at least any one of a displacement, speed or acceleration for vibration pressure in a frequency region of the vibration signal;
detecting, as second response information, at least any one of the displacement, speed or acceleration for vibration pressure in the frequency region based on the response signal; and
calculating the frequency response function based on the first response information and the second response information.

6. The operating method of claim 4, wherein the performing of the biometric authentication based on the frequency response function comprises:
pre-processing the frequency response function in order to remove, from the frequency response function, an effect attributable to a vibration component of the electronic device or the vibration module; and
performing the biometric authentication on the object based on the pre-processed frequency response function.

7. The operating method of claim 4, wherein the performing of the biometric authentication based on the frequency response function comprises:
generating a frequency spectrum for the frequency response function; and
performing the biometric authentication on the object by comparing the frequency response function with a modeled frequency response function based on the frequency spectrum.

8. The operating method of claim 4, wherein the performing of the biometric authentication based on the frequency response function comprises:
detecting biometric information based on the frequency response function; and
determining whether the biometric authentication is successful based on whether user information corresponding to the biometric information is detected, and
wherein the biometric information comprises a mass parameter, hardness parameter, and attenuation parameter of the frequency response function.

9. The operating method of claim 1, wherein the performing of the biometric authentication comprises:
detecting time-series data of the response signal in a time region; and
performing the biometric authentication on the object based on at least one of a pattern or shape of the time-series data.

10. The operating method of claim 1, wherein the performing of the biometric authentication comprises:
combining a plurality of response signals according to a sequence of time, and
performing biometric authentication on a combination of a plurality of objects according to a sequence of time.

11. An electronic device comprising:
a vibration module; and
a processor connected to the vibration module and configured to authenticate a user,
wherein the processor is configured to:
output a first vibration signal to a first touched object through the vibration module,
receive a first response signal for the first vibration signal from the first touched object through the vibration module,
output a second vibration signal to a second touched object through the vibration module,
receive a second response signal for the second vibration signal from the second touched object through the vibration module, and
perform biometric authentication based on a ratio relationship of the first response signal and the second response signal.

12. The electronic device of claim 11, wherein the vibration module comprises:
a contact module configured to come into contact with the object;
a vibration generation module configured to generate a vibration in the contact module and to output the vibration signal in response to the generated vibration; and
a response sensing module configured to measure the vibration generated in the contact module and to detect the response signal in response to the measured vibration.

13. The electronic device of claim 12, wherein in the contact module, a region in which the vibration is generated by the vibration generation module and a region which the vibration is measured by the response sensing module are identical.

14. The electronic device of claim 11, wherein the processor is configured to:
calculate a frequency response function based on the vibration signal and the response signal; and
perform the biometric authentication on the object based on the frequency response function.

15. The electronic device of claim 14, wherein the processor is configured to:
determine, as first response information, at least any one of a displacement, speed or acceleration for vibration pressure in a frequency region of the vibration signal;
detect, as second response information, at least any one of the displacement, speed or acceleration for vibration pressure in the frequency region based on the response signal; and
calculate the frequency response function based on the first response information and the second response information.

16. The electronic device of claim 14, wherein the processor is configured to:
pre-process the frequency response function in order to remove, from the frequency response function, an effect attributable to a vibration component of the electronic device or the vibration module; and
perform the biometric authentication on the object based on the pre-processed frequency response function.

17. The electronic device of claim 14, wherein the processor is configured to:
generate a frequency spectrum for the frequency response function; and
perform the biometric authentication on the object by comparing the frequency response function with a modeled frequency response function based on the frequency spectrum.

18. The electronic device of claim 14, wherein the processor is configured to:
- detect biometric information based on the frequency response function; and
- determine whether the biometric authentication is successful based on whether user information corresponding to the biometric information is detected, and
- wherein the biometric information comprises a mass parameter, hardness parameter, and attenuation parameter of the frequency response function.

19. The electronic device of claim 11, wherein the processor is configured to:
- detect time-series data of the response signal in a time region; and
- perform the biometric authentication on the object based on at least one of a pattern or shape of the time-series data.

20. The electronic device of claim 11, wherein the processor is configured to:
- combine a plurality of response signals according to a sequence of time, and
- perform biometric authentication on a combination of a plurality of objects according to a sequence of time.

* * * * *